(12) United States Patent
Rom et al.

(10) Patent No.: US 6,213,247 B1
(45) Date of Patent: Apr. 10, 2001

(54) HYDRAULIC STEERING DEVICE AND METHOD FOR STEERING A VEHICLE

(75) Inventors: Holger Krogsgård Rom, Støvring; Niels Arbjerg, Sydals, both of (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/091,114

(22) PCT Filed: Dec. 10, 1996

(86) PCT No.: PCT/DK96/00519

§ 371 Date: Sep. 14, 1998

§ 102(e) Date: Sep. 14, 1998

(87) PCT Pub. No.: WO97/21582

PCT Pub. Date: Jun. 19, 1997

(30) Foreign Application Priority Data

Dec. 12, 1995 (DE) .............................. 195 46 282

(51) Int. Cl.[7] .................................................. B62D 5/08
(52) U.S. Cl. ................ 180/441; 180/442; 137/625.24; 60/384
(58) Field of Search ............................ 60/384; 91/467; 137/625.24; 180/421, 441, 442, 417

(56) References Cited

U.S. PATENT DOCUMENTS

| | | | |
|---|---|---|---|
| Re. 25,126 | * 2/1962 | Charlson ............................. | 91/467 |
| 4,620,416 | * 11/1986 | Yip et al. ............................ | 60/384 |
| 5,101,860 | * 4/1992 | Stephenson ....................... | 137/625.24 |
| 5,115,640 | * 5/1992 | Stephenson et al. ................. | 60/384 |
| 5,186,212 | * 2/1993 | Stephenson et al. ............. | 137/625.24 |
| 5,396,969 | * 3/1995 | Joerg et al. ......................... | 180/132 |
| 5,620,026 | * 4/1997 | Stephenson et al. ............. | 137/625.24 |
| 5,638,864 | * 6/1997 | Haarstad et al. ................. | 137/625.24 |

* cited by examiner

Primary Examiner—Brian L. Johnson
Assistant Examiner—Avraham H. Lerner
(74) Attorney, Agent, or Firm—Lee, Mann, Smith, McWilliams, Sweeney & Ohlson

(57) ABSTRACT

A hydraulic steering device, in particular for vehicles, is disclosed, having a housing in which two sliders are arranged to move relative to one another and together form at least one adjustable throttle, a restoring device for restoring the two sliders to their neutral position being provided, one of the two sliders being driveable and the other of the two sliders being in operative connection with a measuring device. In such a steering device it is desirable to improve the correlation between steering torque and flow amplification; in particular it is desirable to linearize the relationship better. For that purpose the measuring device is arranged in a flow path closed in itself, and operates as a pump, while an open flow path runs past the closed flow path from an inlet connection arrangement to an outlet connection arrangement.

19 Claims, 4 Drawing Sheets

HYDRAULIC STEERING DEVICE AND METHOD FOR STEERING A VEHICLE

BACKGROUND OF THE INVENTION

The invention relates to a hydraulic steering device, in particular for vehicles, having a housing in which two sliders are arranged to move relative to one another and together form at least one adjustable throttle, a restoring device for restoring the two sliders to their neutral position being provided, one of the two sliders being driveable and the other of the two sliders being in operative connection with a measuring device. Furthermore, the invention relates to a method for steering a vehicle, in which hydraulic fluid is supplied to steering motor, is passed by way of a steering device and back again, two sliders being mutually displaced in the steering device.

Such a steering device and such a method are known from U.S. Pat. No. 4,759,182. The two sliders are in that case arranged concentrically with respect to one another in the housing. They are mutually rotated during steering, in which case the inner slider can be acted upon by a steering handwheel whilst the outer slider is connected by way of a spring arrangement, which serves as the restoring arrangement, to the inner slider. In this manner a certain relative movement is possible between the two sliders. The neutral position can be achieved, however, only if hydraulic fluid has flowed through the measuring motor and has driven it so that the outer slider is able to track the inner slider. With the known steering device, it is intended to achieve amplification of the hydraulic fluid so that not all of the hydraulic fluid is able to flow through the measuring motor. For that purpose an adjustable throttle is provided parallel to the measuring motor.

Nevertheless, it should also be possible to operate such steering devices even when the pressure source fails. In that case the measuring motor has to be used as an auxiliary pump, which generates the pressure required to control the steering motor. For that reason the adjustable throttle in the flow path that is arranged parallel to the measuring motor has to close at the upper end of the control range. The in itself intended amplification of the hydraulic flow thus disappears just as a large and rapid angle of lock is being effected. It is precisely in critical situations, however, that such an angle of lock is often desirable. If the desired amplification is not forthcoming, this can lead to dangerous situations.

SUMMARY OF THE INVENTION

The problem underlying the invention is to improve the co-operation between the steering torque and the amplification of the flow, in particular to linearize the relationship between steering torque and amplification of the flow in a better manner and to improve the stability of the steering device.

In a steering device of the kind mentioned in the introduction, that problem is solved in that the measuring device is arranged in a flow path closed in itself, and operates as a pump, and an open flow path runs past the closed flow path from an inlet connection arrangement to an outlet connection arrangement.

The outlet connection arrangement in this case contains two working connections that are connected to a steering motor. Depending on which one of the two working connections is being pressurized, the steering motor steers to the left or to the right. The inlet connection arrangement comprises a pump connection, which is connected to a pump or to another source of pressure, and a tank connection, which feeds hydraulic fluid flowing back from the steering motor back into the tank. The construction according to the invention provides two circulations, which can be isolated from one another hydraulically. These circulations are the closed flow path, in which the measuring device is arranged and which is designed merely to control the relative movement of the two sliders, and the open flow path, through which the "working fluid" flows from the pressure side to the steering motor and back again. At least the open flow path is controlled by the movement of the two sliders relative to one another. After actuation of the one slider, the adjustable throttle in the open flow path is opened and the hydraulic fluid is able to flow from the pump to the working connections. By means of the restoring device, the driven slider now attempts to take the non-driven slider with it, that is, the restoring device tracks the other slider onto the driven slider. In this connection, however, the guided slider has to operate the measuring device in the form of a pump and convey a fluid through the closed circulation so that because of this work to be performed, restoring of the non-driven slider into the neutral position is delayed. With an appropriate configuration of the adjustable throttle and of the two sliders, it is possible to ensure that on movement of the one slider effected by the external drive means, the throttle in the open flow path remains open just long enough for the desired amount of hydraulic fluid to flow to the steering motor. The desired amount of hydraulic fluid is the amount that is necessary to move the steering motor by a desired distance. Because the closed flow path is kept clear of the hydraulic fluid in the open flow path, the measuring device can be made relatively small. Good accuracy is achieved even when the vehicle requires a relatively large amount of hydraulic fluid for steering, which is the case, for example, with large vehicles or driven machines. Both flow paths can be dimensioned independently of one another. Isolating the two flow paths from one another prevents hydraulic fluid being forced out of the open flow path into the closed flow path. In addition, the steering device is more stable than known steering devices, in particular in respect of a tendency to oscillate.

In a preferred construction, the closed flow path has at least one throttle that is adjustable through movement of the two sliders relative to one another. In this manner the control behaviour of the steering device can be yet further improved. The response behaviour of the steering device can, in fact, be changed by the adjustable throttle in the closed flow path. When the throttle is opened wide, the non-driven slider is able to track onto the driven slider more quickly than when this throttle is closed or almost closed. The adjustable throttle in the closed flow path accordingly also remains open for a longer or for a shorter period. The adjustable throttle in the closed flow path therefore provides a further opportunity for the amplification factor of the steering device to be influenced.

In the closed flow path there is preferably at least one adjustable throttle which increases the flow resistance through the closed flow path from a predetermined relative movement of the two sliders onwards. In this manner, particularly when using a steering handwheel to drive the one slider, a counter-torque can be generated, because it is more difficult for the restoring device to guide the non-driven slider on account of the greater hydraulic resistance in the closed flow path. The counterforce that is acting on the driven slider through the restoring device is accordingly the force then acting on the steering handwheel.

The open flow path preferably has at least one adjustable throttle, both between the inlet connection arrangement and the outlet connection arrangement and between the outlet connection arrangement and the inlet connection arrangement. A more uniform distribution of the forces acting on the two sliders can thus be achieved. The risk that the two sliders will become jammed against one another or in the housing is less. By using two throttles matched to one another, the load on an individual throttle is additionally kept lower.

In the open flow path there is preferably arranged an adjustable measuring throttle, which serves as signal generator for an LS-signal. An LS-signal, which is also called a loadsensing-signal, provides information about the pressure load in the steering device. This information can be used, for example, for controlling, as required, the pump providing the necessary hydraulic pressure.

Preferably, however, a pressure-influencing device is also provided, which holds the pressure drop across the measuring throttle constant by means of the LS-signal. The amount of flow through the measuring throttle and the degree of opening of the measuring throttle are thus well correlated with one another. In most cases a virtually linear dependency between the degree of opening of the measuring throttle and the amount of hydraulic fluid flowing through can therefore be achieved.

In this connection it is especially preferred for a measuring point in the open flow path downstream of the measuring throttle to be connected by way of a short-circuiting throttle to a tank connection, the short-circuiting throttle being open in the neutral position and closing when the two slide valves are adjusted relative to one another. A loadsensing-system can be achieved in this manner. This can be of dynamic construction in the present case. A static system would also be conceivable.

In an especially preferred construction, provision is made for a non-return valve closing in the direction towards the closed flow path to be provided between the open and the closed flow path. Using this non-return valve, an emergency steering function can now be achieved despite the isolation of the two flow paths. When, in fact, pump pressure fails, the pressure of the hydraulic fluid delivered by the measuring device, here acting as a pump, is sufficient to open the non-return valve. The measuring device can then pump hydraulic fluid through the non-return valve into the open flow path in order to actuate the steering motor. The path in the reverse direction remains blocked by the non-return valve, however, so that the flow of the hydraulic fluid in the closed flow path is not influenced by the flow of hydraulic fluid in the open flow path.

The non-return valve is preferably in this case connected to a pump line of the open flow path and a connection to the tank line of the open flow path is provided. The emergency steering function is thus no longer restricted to the amount of fluid that is provided in the closed flow path. On the contrary, hydraulic fluid can be drawn subsequently from the tank through the tank line.

In this instance, a throttle, in particular a closable throttle, is preferably arranged between the non-return valve and the connection to the tank line. When the measuring device is acting as a pump and pumping hydraulic fluid, the throttle can be closed, so that the hydraulic fluid is then no longer pumped round in circulation in the closed flow path but flows through the non-return valve into the open flow path.

It is also preferred for the non-return valve to open out into the pump line upstream of the first throttle in the pump line. That is the point at which, when the pump is intact, pressure is greatest. The non-return valve is thus held closed with great reliability. Influence on the fluid in the closed flow path by the fluid in the open flow path is thus excluded with great reliability.

A shut-off valve is preferably provided in the closed flow path. By means of this shut-off valve the flow in the closed flow path can be interrupted. As soon as the flow path is interrupted, it is no longer possible for the non--driven slider to be tracked by means of the restoring device into the position of the driven slider. The relative displacement of the two sliders with respect to one another is maintained. In this position hydraulic fluid is now able to flow from the pump to the steering motor without the steering having to be further actuated, for example, without the steering handwheel have to be turned further. This mode of operation, which is also known as "spak" steering, takes the workload off an operator. With the shut-off valve closed, the operator need only displace the steering handwheel through a predetermined angular range. The steering motor pushes the wheels or other control elements to be steered into the intended position for as long as the steering hand wheel is displaced.

The shut-off valve is preferably in the form of a pressure-controlled valve which is acted upon in the opening direction by pump pressure. The shut-off valve thus acquires an additional function. In fact, it automatically interrupts the closed flow path when the pump pressure drops. In that case it is to be assumed that the pump is not able to apply the necessary pressures for steering the vehicle so that now the emergency steering function of the measuring device has to be used. Since the shut-off valve prevents the hydraulic fluid conveyed by the measuring device from flowing in circulation through the closed flow path, the hydraulic fluid conveyed by the measuring device is then automatically pumped to the steering motor.

The shut-off valve is preferably acted upon in the closing direction by pressure downstream of the measuring throttle. The shut-off valve is thus held open by the pressure across the measuring throttle. When this pressure drops too low, for example, because on further displacement of the two sliders relative to one another the measuring throttle has opened wide, a further movement of the sliders is blocked, which could be interpreted by an operator as an end stop. At the same time, however, the non-driven slider is prevented from tracking the driven slider, so that in the case of large steering locks of the steering handwheel the "spak" control sets in automatically.

It is also preferred for the shut-off valve to be in the form of an electromagnetic valve. External signals can then be used to change the steering mode and to instigate a so-called "spak" control.

Between the inner and the outer slider there are advantageously two pressure chambers which are pressurizable with fluid under pressure, an increase in the volume of one pressure chamber effecting a relative displacement of the two sliders. In this manner the steering device can also be acted upon by remote control, that is, the one slider can be driven by pressurization of one of the two pressure chambers.

In this connection it is preferred for the two sliders to be arranged concentrically with respect to one another and for the two pressure chambers to have in section the form of a circular annular portion, both the outer and the inner slider having a respective projection which bears against the respective other slider and bounds the pressure chambers. The concentric arrangement of the two sliders allows a simple orientation of the two sliders in one direction and enables relative movement in another direction to be realized relatively easily.

The two pressure chambers are preferably connected by a respective control device to a pressure source. This facilitates the remote control. The control device can control the pressures in the two pressure chambers or the pressure in each pressure chamber so that the desired relative movement of the two sliders with respect to one another is achieved.

The control devices are preferably pulse-controlled electromagnetic valves. Such electromagnetic valves can be controlled, for example, by a pulse-pause modulation, which allows a very precise setting of the two sliders with respect to one another.

The problem is also solved by a method of the kind mentioned in the introduction, in which restoring of the two sliders into their neutral position is influenced by a separate fluid.

This other fluid, which is located in the closed flow path, basically causes the delay with which the two sliders move into their neutral position again. More accurately, it causes the delay with which the one slider is tracked onto the other slider. Until the two sliders are in their mutual neutral position again, pressurization of the steering motor with hydraulic fluid is ensured.

BRIEF DESCRIPTION OF THE DRAWINGS

The invention is described hereinafter with reference to preferred embodiments in conjunction with the drawings, in which.

DESCRIPTION OF THE PREFERRED EMBODIMENTS

Figure 1:
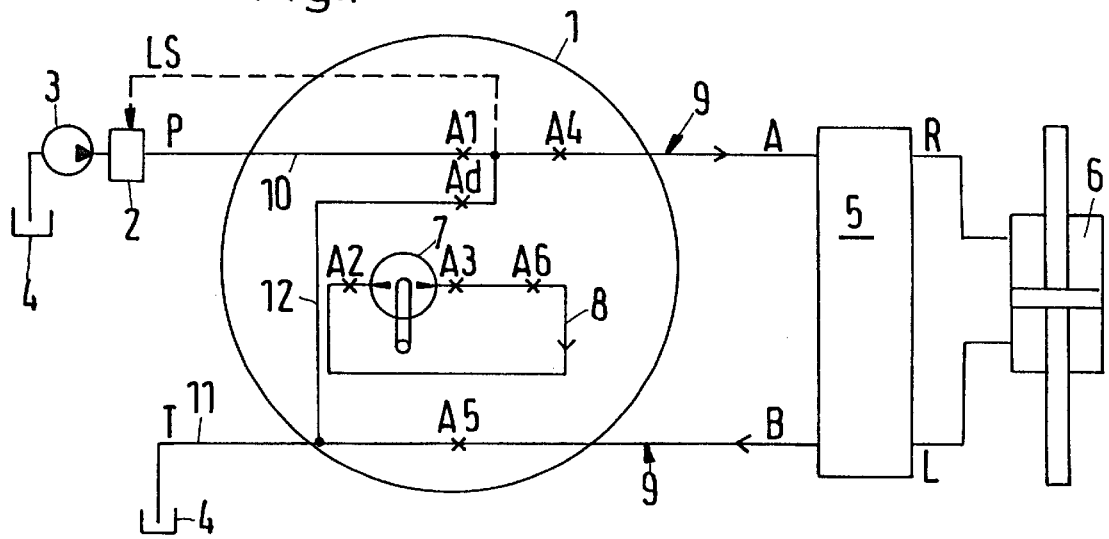
FIG. 1 shows a first embodiment of a steering device connected to a steering motor.

A steering device 1 has a pump connection P which is connected by way of a priority valve 2 to a pump 3 which pumps hydraulic fluid from a tank 4 through the steering device 1. Furthermore, the steering device 1 has a tank connection T which is similarly connected to the tank 4. The pump connection P and the tank connection T together form an inlet connection arrangement.

The steering device 1 furthermore has an outlet connection arrangement having working connections A, B which are connected by way of a direction-determining unit 5 to direction connections R, L which in turn are connected again to a steering motor 6. The direction-determining unit 5 is drawn in as a separate component merely for reasons of clarity. In reality the direction-determining unit 5 is a component of the steering device 1. The direction control is effected in that the steering device 1 is acted upon, in different directions each time, by a torque, so that its sliders, not illustrated here, move in different directions relative to one another.

In a manner that is known but not illustrated more specifically, the steering device 1 has a housing which is provided with the said connections P, T, R, L and in which two sliders are arranged concentrically with respect to one another. Both sliders are rotatable, both against one another and with respect to the housing.

The inner of the two sliders is in this case drivable, for example, by way of a shaft connected to a steering handwheel or by a remote control motor. The outer slider is connected by way of a restoring device, for example, a spring arrangement, to the inner slider.

When the inner slider is turned, the restoring arrangement attempts to track the outer slider onto it and to bring it again into a position with respect to the inner slider in which the two sliders assume their neutral position with respect to one another.

The outer slider, however, as is known, for example, from U.S. Pat. No. 4,759,182 mentioned at the beginning, is connected to a measuring device 7, for example the gearwheel of a gear assembly which orbits and rotates in a toothed ring. The functions of inner and outer slider can, of course, be exchanged.

Unlike the known case, the measuring device 7 does not act as a motor which is driven from the outside by hydraulic fluid, but as a pump. This pump, as can be seen from FIG. 1, is arranged in a closed flow path 8. This flow path 8 runs from the outlet of the measuring device 7 to its input. The flow path 8 contains three adjustable throttles A2, A3 and A6. These throttles A2, A3 and A6 are formed by openings in the two sliders which can be brought into register or displaced out of register. Alternatively, the throttles (and this applies also to further throttles) that are formed in the steering device 1 can be formed by surface structures in the sliders.

In this case the two throttles A2, A3 are constructed so that they are opened on rotation of the sliders against one another. The throttle A6 on the other hand is constructed so that from a certain relative movement of the two sliders onwards it starts to close and is closed at a certain angle of rotation of the two sliders. When the measuring device 7 is actuated in the case of a small displacement or rotation of the two slider against one another, in the closed flow path 8 there is a certain flow resistance, so that it takes some time for the two sliders to be returned by the restoring device to their neutral position with respect to one another again, because the pump needs some time to drive the required amount of hydraulic fluid through the closed flow path 8.

Furthermore, the steering device 1 has an open flow path 9 which is formed by a pump line 10 and a tank line 11. The pump line 10 is in connection with the pump connection P and a working connection A. The tank line is arranged between the tank connection T and the other working connection B. Two adjustable throttles A1, A4 are arranged in the pump line 10. A further adjustable throttle A5 is arranged in the tank line 11. These throttles A1, A4 and A5 are also created by the two sliders, that is, they are adjusted by rotating the two sliders relative to one another. The throttles A1, A4 and A5 open as the two sliders are rotated against one another.

Furthermore, a short-circuiting line 12 with a short-circuiting throttle Ad is provided; this is arranged between the pump line 10 and the tank line 11. The short-circuiting line 12 branches off in this case between the two throttles A1, A4. The short-circuiting throttle Ad is open in the neutral position of the two sliders and closes as soon as the two sliders have been rotated against one another through a small angle. The opening and closing characteristics of the individual throttles is apparent from FIG. 7.

The throttle A1 can be also be termed a measuring throttle. An LS signal is tapped off downstream thereof, that is, the pressure downstream of the measuring throttle A1 is determined. It is returned to the priority valve 2 and controls that priority valve 2 so that the pressure across the measuring throttle A1 is always maintained at a constant level. In this manner the amount flowing through the measuring throttle A1 in practice always has a virtually linear dependency on the degree of opening of the measuring throttle A1. The LS signal can alternatively also be used as control signal for a controllable pump.

The steering device according to FIG. 1 operates as follows:

When the inner slider is rotated relative to the outer slider through a small angle, for example, through 5°, the throttles A1 to A5 open. The short-circuiting throttle Ad is closed. Hydraulic fluid is able to flow from the pump 3 to the steering motor 6. The hydraulic fluid displaced by the steering motor 6 flows through the steering device 1 back to the tank 4 again. The amount delivered to the steering motor 6 is controlled by way of the throttles A1, A4 and A5.

At the same time the restoring device attempts to bring the two sliders back into their neutral position again, that is, to reduce the angle to 0°. For that purpose, however, the outer slider must first of all actuate the measuring device 7, in order to be able to follow the inner slider, and circulate the corresponding amount of hydraulic fluid through the closed flow path 8, that is, through the throttles A2, A3 and A6. When the restoration is complete, the throttles A1, A2, A3, A4 and A5 are again closed.

Figure 7:
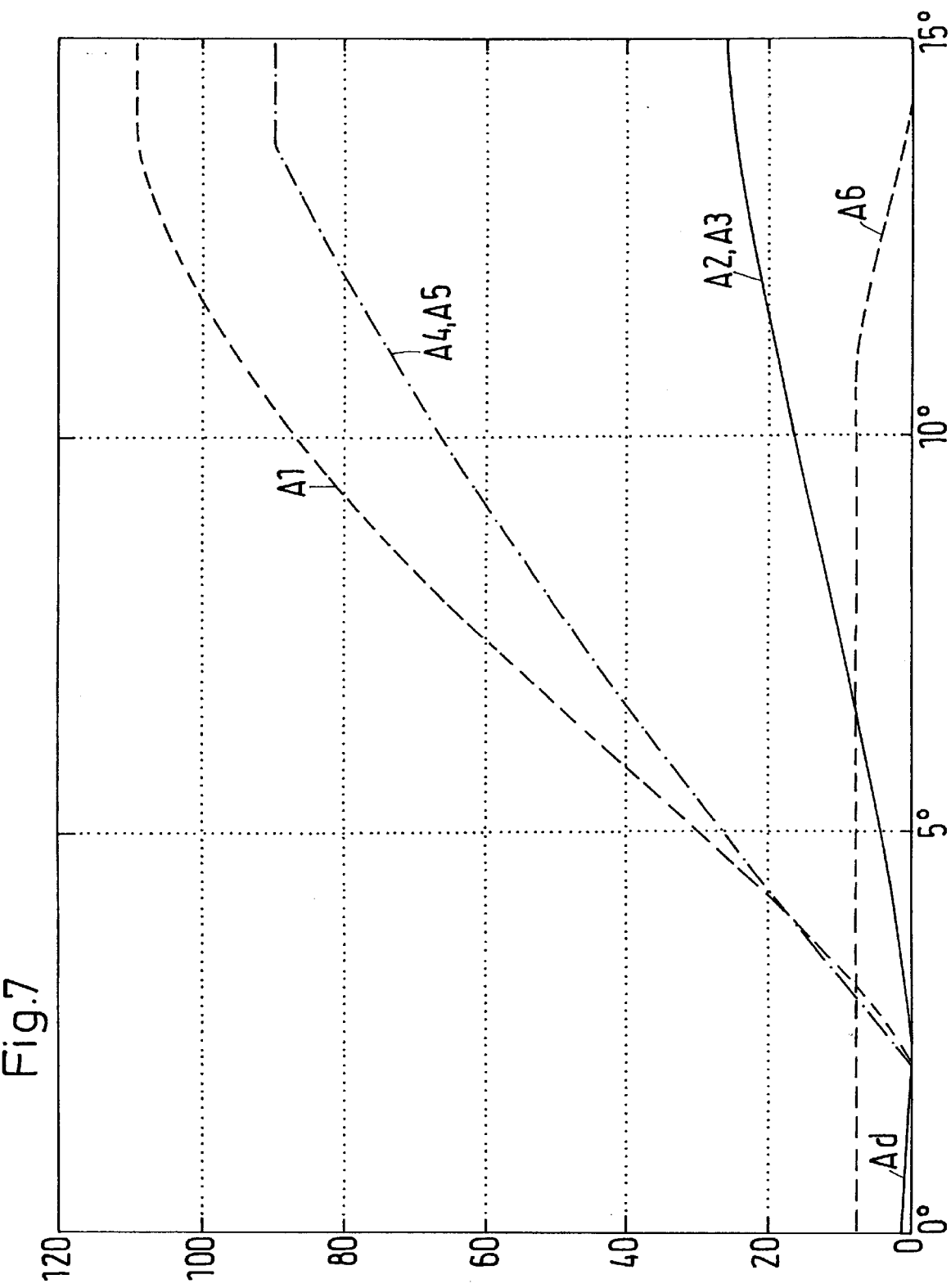
FIG. 7 shows curves to illustrate the degree of opening of adjustable throttles in dependence on the displacement path.

As is apparent from FIG. 7, the dependency between the angle of rotation and the degree of opening of the throttles is virtually linear. Since the pressure drop across the measuring throttle A1 is kept constant by means of the LS signal, a virtually linear amplification characteristic can be achieved as a result, that is, the steering lock of the steered wheels (or other control element, such as a ship's rudder) corresponds always to the same multiple of the steering lock of a steering handwheel or other drive means for the steering device.

For large steering locks of the steering handwheel, that is, for large relative displacements between the two sliders, the control is somewhat different, however. When the two sliders are displaced against one another by more than a certain angle, for example, by 15°, the adjustable throttle A6 is closed (see FIG. 7). In that case, the hydraulic fluid can no longer flow through the closed flow path 8 so that the measuring device 7 acting as pump can no longer deliver any hydraulic fluid either. Tracking of the outer slider relative to the inner slider is blocked thereby. Both sliders remain therefore in their rotated position with respect to one another, whereby the throttles A1, A4, A5 in the open flow path 9 remain open. Without further rotation of the steering handwheel the steering motor 6 is therefore displaced further, to be precise at a speed that corresponds to the degree of opening of the throttles A1, A4 and A5 which then obtains.

In this construction the measuring device 7 can be relatively small. Basically, it need only delay the tracking of the outer slider relative to the inner slider driven by the steering handwheel or a remote control means until a satisfactory amount of hydraulic fluid has flowed to the steering motor 6.

The two flow paths 8, 9 can be completely isolated from one another. In principle, a fluid other than that used in the open flow path 9 can even be used in the closed flow path 8. Advantageously, however, the same hydraulic fluid will be used in both flow paths, because it is virtually impossible to obtain a slider assembly in the steering device 1 that is completely sealed.

Figure 2:
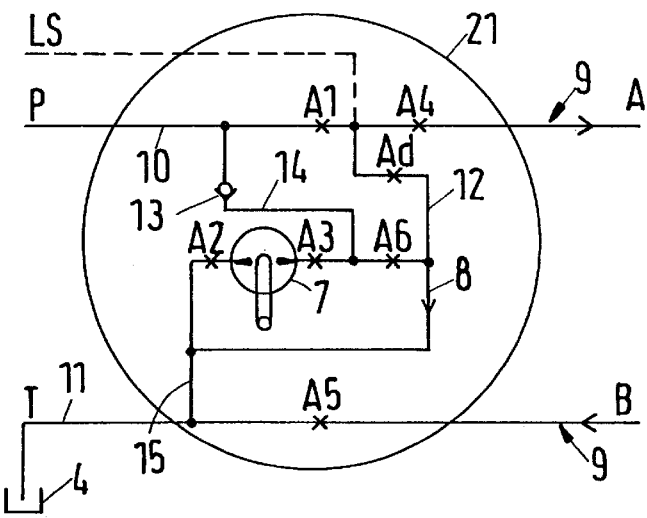
FIG. 2 shows a second embodiment of a steering device.

FIG. 2 shows a second embodiment of a steering device 21, in which parts that correspond to those of FIG. 1 have been given the same reference numbers.

There are two changes with respect to the configuration shown in FIG. 1. Firstly, the short-circuiting line 12 is now led through the closed flow path 8. This presents no problems because on rotation of the two sliders against one another the throttle Ad closes, so that there is no need to fear that hydraulic fluid will penetrate from the open flow path 9 into the closed flow path 8. Conversely, in the neutral position of the two sliders, no flow through the closed flow path 8 is possible, because the throttles A2, A3 are closed.

Additionally, a non-return valve 13 is provided between the closed flow path 8 and the opening flow path 9; this valve closes towards the closed flow path 8. The non-return valve is arranged in an auxiliary line 14 which is connected between the throttles A3, A6 in the closed flow path 8 and between the pump connection P and the throttle A1 in the open flow path 9, or more accurately, in the pump line 10. The non-return valve 13 is thus acted upon in the closing direction by the pump pressure and in the opening direction by the pressure between the throttles A3 and A6. Since the pressure in the pump connection P is generally greater than the pressure upstream of the throttle A6, the non-return valve 13 normally stays closed. It opens only when the pressure at the pump connection P drops virtually to zero. That only happens when the pump 3 is defective. In that case, the measuring device 7 can serve as emergency pump.

For that purpose the closed flow path 9 is connected by way of an intake line 15 to the tank line 11, so that the measuring device 7 is able to draw hydraulic fluid from the tank by way of the intake line 15. During this emergency operation, large displacements of the two sliders relative to one another are required in order to drive the measuring device 7 with the necessary power. With such a large displacement, however, the throttle A6 is closed, so that the hydraulic fluid is pumped out of the tank line 11 by way of the throttles A2, A3, the non-return valve 13 and the throttles A1, A4 to the steering motor 6.

A non-return valve which opens in the direction towards A1 can advantageously also be inserted between the points P and A1. This ensures that hydraulic fluid does not flow to the outside through the P-line when, for example, a pressure connection is interrupted.

Figure 3:
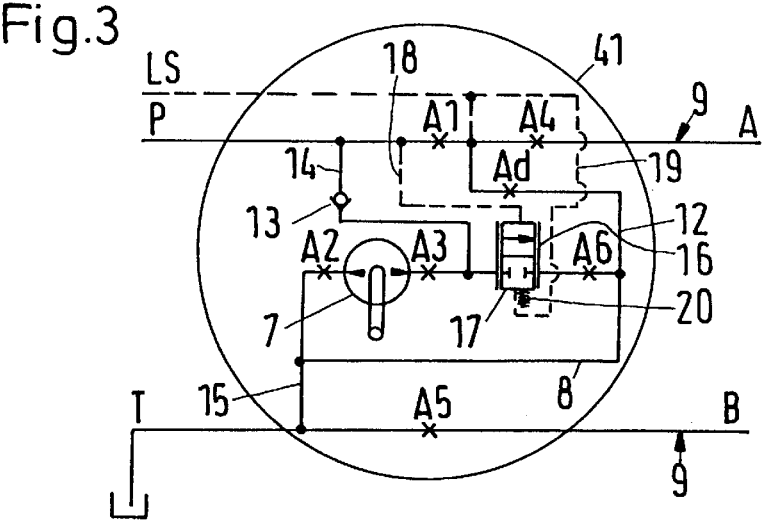
FIG. 3 shows a third embodiment of a steering device.

FIG. 3 shows a third configuration of a steering device 41, in which parts that correspond to those of FIGS. 1 and 2 are provided with the same reference numbers.

Compared with FIG. 2, a shut-off valve 16 that is provided with a slider 17 has been added. The shut-off valve 16 is arranged in the closed flow path 8 and in the position illustrated in FIG. 3 is able to prevent a circulation of fluid in the closed flow path 8.

The slider 17 is acted upon by the pressure drop across the measuring throttle A1, that is, the slider 17 is acted upon in the opening direction by the pressure at the pump connection P by way of a line 18 and in the closing direction by the LS-pressure by way of a line 19 and by a spring 20.

If the pressure drop across the measuring throttle A1 drops, the force of the spring 20 is sufficient to displace the slider 17 into the closed position. If the flow path 8 is interrupted, the measuring device 7 can no longer convey fluid and creates an obstacle thereby so that rotation of the outer slider is blocked. Only the inner slider is able to rotate and is automatically rotated back into the neutral position by the restoring spring. This again provides the so-called "spak" control. The strength of the spring 20 can be selected, for example, such that its force exceeds the force of the pressure drop across the measuring throttle A1 whenever the measuring throttle A1 has reached its widest opening width. In that case, further rotation of the two sliders would be meaningless.

Figure 4:
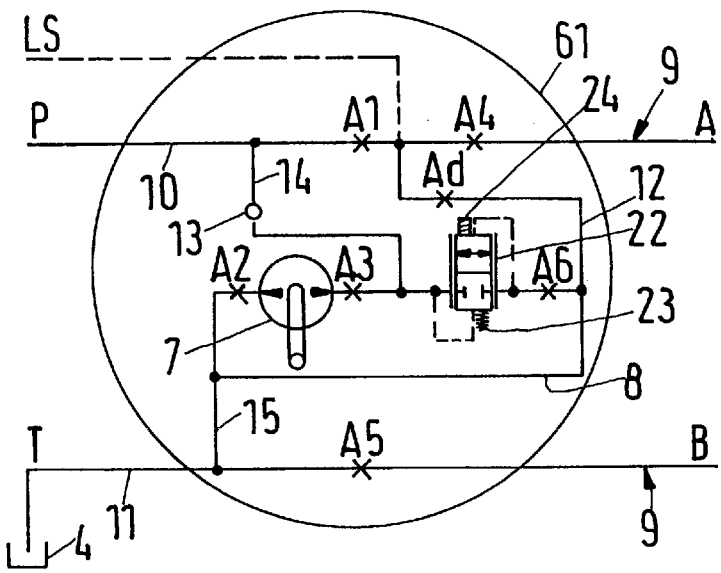
FIG. 4 shows a fourth embodiment of a steering device.

In the configuration shown in FIG. 4, in which parts that correspond to those of FIGS. 1 to 3 have been provided with the same reference numbers, there is also a shut-off valve 22 present, but this is in the form of an electromagnetic valve. The electromagnetic valve is closed by a spring 23 and opened by a magnetic drive 24. The "spak" control can thus also be instigated regardless of the displacement of the two sliders that has been effected.

In many cases the inner slider of the steering device is driven by a steering handwheel by way of a shaft.

Figure 5:
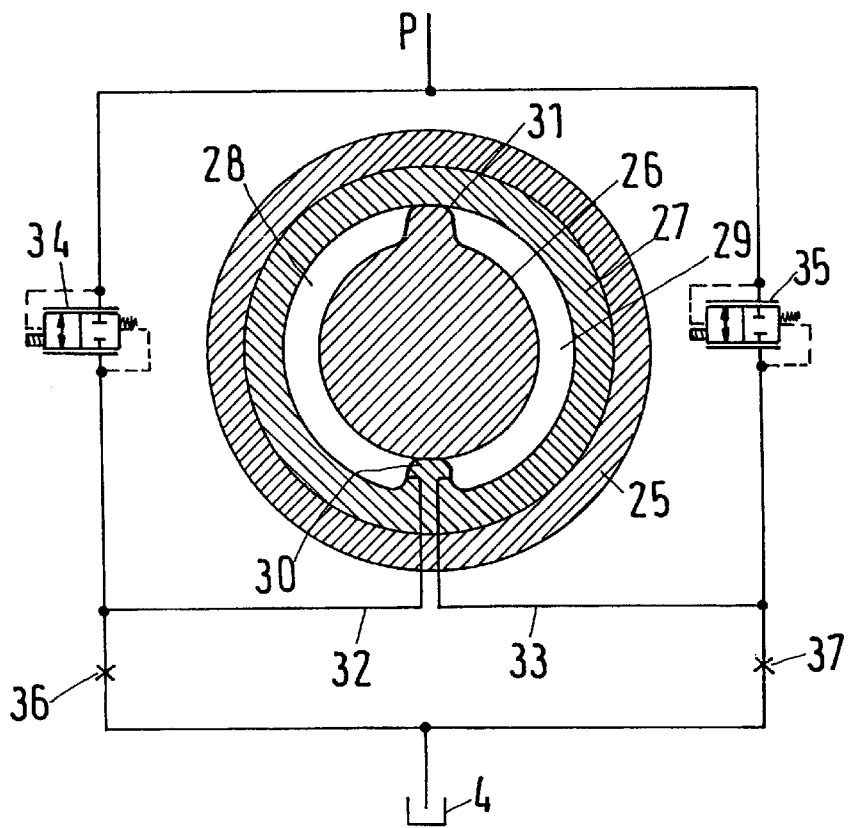
FIG. 5 is a diagrammatic view of a steering device.

An alternative configuration is illustrated in FIG. 5; this configuration can also be used together with a steering handwheel.

In the housing 25 an inner slider 26 and an outer slider 27 are arranged concentrically with respect to one another. Between the inner slider 26 and the outer slider 27 there are formed two pressure chambers 28, 29 which are formed from one another by a projection 30 on the outer slider 27, which bears against the inner slider 26, and by a projection 31 on the inner slider 26, which bears against the outer slider 27. Both pressure chambers are connected by way of lines 32, 33 to the pump connection P. In both lines, however, there is inserted an electromagnetic valve arrangement 34, 35 which controls the flow of the hydraulic fluid into the lines 32, 33 and thus the pressure in the pressure chambers 28, 29. The electromagnetic valves 34, 35 can be pulse-controlled in order to set the desired pressure each time in the pressure chambers 28, 29. Surplus hydraulic fluid can drain off via throttles 36, 37 to the tank 4. When, for example, the electromagnetic valve 34 is opened, the pressure in the pressure chamber 28 rises and the inner slider 26 is rotated clockwise until a pressure equilibrium is produced. In the opposite case, the pressure in the pressure chamber 29 is increased.

Figure 6:
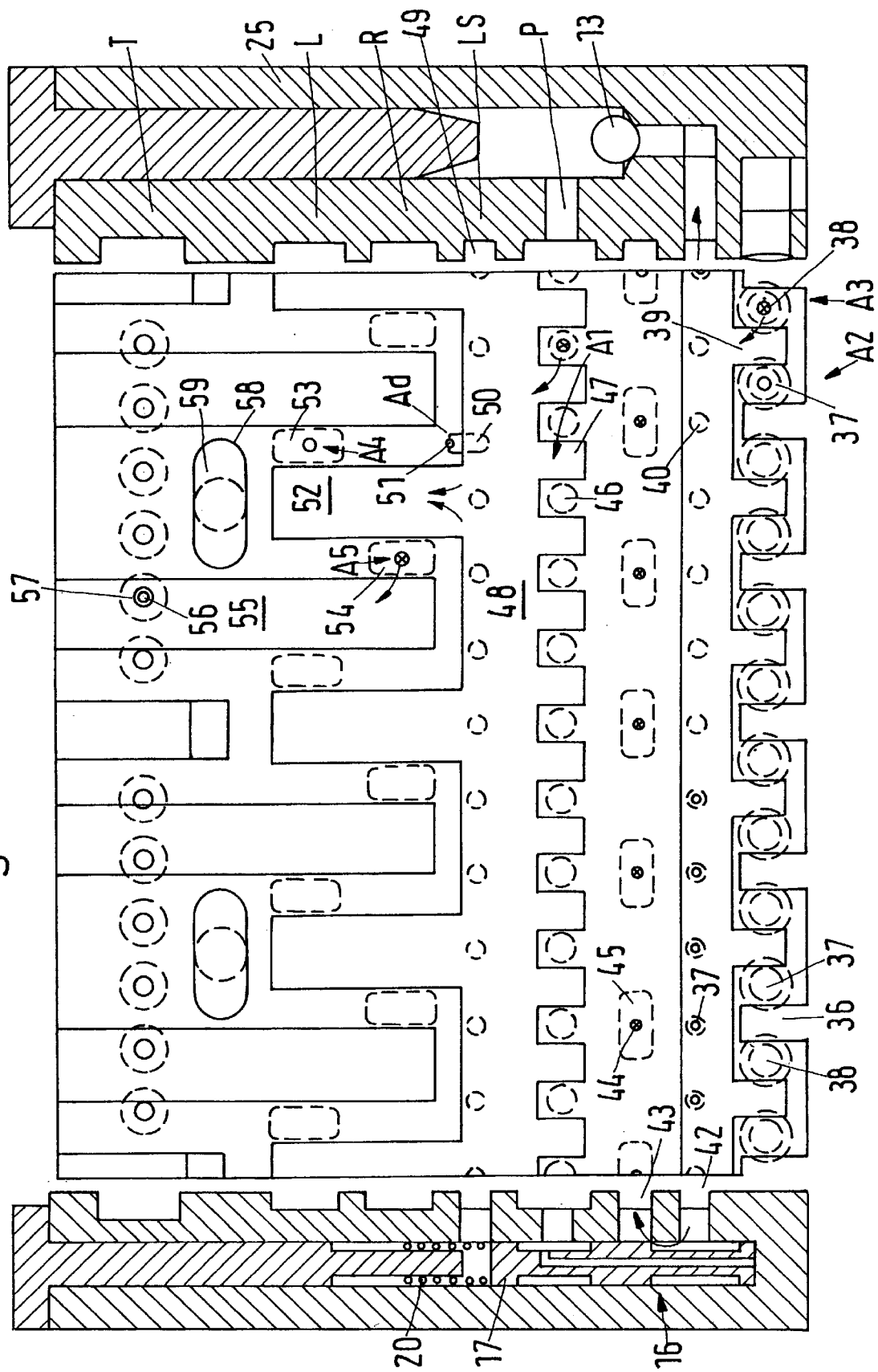
FIG. 6 is a developed view of a slider arrangement.

FIG. 6 is a developed view of the two sliders, the contours on the outer surface of the inner slider 26 being represented by solid lines whilst holes or through-openings in the outer slider 27 are represented by broken lines. The contours of the housing 25 in radial section are shown hatched.

The closed flow path 8 has slots 36, 39 and bores 37, 38. The slot 36 of the inner slider has a connection to the tank connection T. The slot 36 forms, together with the bores 37, the throttle A2. A connection, not illustrated, in the housing 25 leads from the bore 37 to the measuring device 7. From the measuring device 7 the hydraulic fluid flows back through the housing 25 to the bores 38 which form, together with the slots 39, the throttle A3. The slots 39 are connected by way of the bores 40 to the non-return valve 13. Similarly, the slots 39 are connected by way of the bores 40 to an annular channel 42 of the housing 25. The annular channel 42 is connected to the shut-off valve 16 which comprises the slider 17 and the spring 20. When the shut-off valve 16 is opened, it provides a connection to a further annular channel 43, which is connected to bores 44 which together with an elongate opening 45 form the throttle A6. From here on, the hydraulic fluid is able to flow to the slots 36 again, or alternatively to the tank, which is connected to the slots 36.

From the connection P onwards the open flow path 9 is formed by holes 46 which together with slots 47 form the throttle A1. The throttle A1 is connected to a wider channel in which there are bores 48 which lead to the LS line or LS groove 49.

Furthermore, the throttle Ad is formed by openings 50, which co-operate with bores 51. Here, the openings 50 are arranged on the outer slider and the bores 51 are arranged on the inner slider.

The annular channel at the outlet of the throttle A1 is also in connection with slots 52 of the inner slider. On rotation of the two sliders relative to one another, these slots can come into register with an elongate opening 53 of the outer slider, with the result that a connection to the L-connection can be formed, or with an opening 54, which is connected to the R-connection. Depending on the direction in which the two sliders are rotated against one another, the control of the steering device as regards direction therefore follows automatically. The opening 54 then coincides with an elongate slot 55. Together with the opening 53 the slot 52 forms the throttle A4. Together with the opening 54 the slot 52 forms the throttle A5. When the displacement is effected in the other direction, the conditions are reversed, that is, together with the opening 54 the slot 52 forms the throttle A4 and together with the opening 53 the slot 55 forms the throttle A5. From the slots 55 a connection to the tank is effected by way of a bore 56 and an opening 57.

Furthermore, an elongate hole 58 is provided in the inner slider into which a pin projects; this pin can be inserted into a hole 59 in the outer slider. That acts as a specific means limiting the movement of the two sliders.

What is claimed is:

1. A hydraulic steering device having a housing in which two sliders are arranged to move relative to one another and together form at least one adjustable throttle, a restoring device for restoring the two sliders to their neutral position, one of the two sliders being driveable and the other of the two sliders being in operative connection with a measuring device, and in which the measuring device is located in a closed flow path and operates as a pump, and including an open flow path associated with the closed flow path, the open flow path extending from an inlet connection arrangement to an outlet connection arrangement.

2. Steering device according to claim 1, in which the closed flow path has at least one throttle that is adjustable through movement of the two sliders relative to one another.

3. Steering device according to claim 1, in which in the closed flow path there is at least one adjustable throttle which increases flow resistance through the closed flow path after predetermined relative movement of the two sliders relative to one another.

4. Steering device according to claim 1, in which the open flow path has at least one adjustable throttle located between the inlet connection arrangement and the outlet connection arrangement and at least one adjustable throttle located between the outlet connection arrangement and the inlet connection arrangement.

5. Steering device according to claim 1 in which in the open flow path there is arranged an adjustable measuring throttle, which serves as signal generator for an LS-signal.

6. Steering device according to claim 5, including a pressure-influencing device which holds pressure drop across the measuring throttle constant by means of the LS-signal.

7. Steering device according to claim 5, in which a measuring point in the open flow path downstream of the measuring throttle is connected by way of a short-circuiting throttle to a tank connection, the short-circuiting throttle being open when the two sliders are in the neutral position and closing when the two sliders are adjusted relative to one another.

8. Steering device according to claim 1, including a non-return valve closing in the direction towards the closed flow path and being located between the open and the closed flow path.

9. Steering device according to claim 8, in which the non-return valve is connected to a pump line of the open flow path and includes a connection to the tank line of the open flow path.

10. Steering device according to claim 9, including a closable throttle located between the non-return valve and the connection to the tank line.

11. Steering device according to claim 9, in which the non-return valve opens into the pump line upstream of a first throttle in the pump line.

12. Steering device according to claim 1, in which a shut-off valve is located in the closed flow path.

13. Steering device according to claim 12, in which the shut-off valve comprises a pressure-controlled valve which is acted upon in the opening direction by pump pressure.

14. Steering device according to claim 13, in which the shut-off valve is acted upon in the closing direction by pressure downstream of a measuring throttle.

15. Steering device according to claim 12, in which the shut-off valve comprises an electromagnetic valve.

16. Steering device according to claim 1, including two variable volume pressure chambers between the sliders, the pressure chambers being pressurizable with fluid under pressure, an increase in the volume of one pressure chamber effecting a relative displacement of the two sliders.

17. Steering device according to claim 6, in which the two sliders are concentric with respect to one another and the two pressure chambers have in section the form of a circular annular portion, each slider having a respective projection which bears against the respective other slider and bounds the pressure chambers.

18. Steering device according to claim 6, in which the two pressure chambers, are connected by a respective control device to a pressure source.

19. Steering device according to claim 8, in which the control devices comprise pulse-controlled electromagnetic valves.

* * * * *